(12) United States Patent
Lin et al.

(10) Patent No.: US 8,292,444 B2
(45) Date of Patent: Oct. 23, 2012

(54) UNIFORMLY SELF-LUMINOUS KEYBOARD DEVICE

(75) Inventors: Chin-Yi Lin, Taipei Hsien (TW); Chih-Hsiung Chen, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 806 days.

(21) Appl. No.: 12/260,644

(22) Filed: Oct. 29, 2008

(65) Prior Publication Data

US 2010/0103644 A1    Apr. 29, 2010

(51) Int. Cl.
*G01D 11/28* (2006.01)
(52) U.S. Cl. ............. 362/23; 362/24; 362/29; 362/600; 362/612; 200/314; 200/341; 200/344; 200/345
(58) Field of Classification Search ............ 362/24, 362/29, 600, 612, 615, 623, 23, 27, 30; 200/314, 200/5 R, 5 A, 344, 345, 341
See application file for complete search history.

(56) References Cited

U.S. PATENT DOCUMENTS

| 4,929,062 | A   | * | 5/1990  | Guzik et al. ............... 349/65 |
|-----------|-----|---|---------|-------------------------------------|
| 5,936,554 | A   |   | 8/1999  | Stanek                              |
| 6,220,741 | B1  | * | 4/2001  | Kawachi et al. ............ 362/561 |
| 6,987,466 | B1  | * | 1/2006  | Welch et al. ................ 341/22|
| 6,997,572 | B2  | * | 2/2006  | Ono et al. .................. 362/24 |
| 7,001,060 | B1  | * | 2/2006  | Kimura ...................... 362/620|
| 7,239,303 | B2  | * | 7/2007  | Liao et al. ................. 345/168|
| 7,278,750 | B2  |   | 10/2007 | Cheng                               |
| 7,573,463 | B2  | * | 8/2009  | Liess ........................ 345/170|
| 7,588,338 | B2  | * | 9/2009  | Chou ......................... 362/24 |
| 7,600,908 | B2  | * | 10/2009 | Chang et al. ............... 362/623 |
| 7,608,792 | B1  | * | 10/2009 | Tsai .......................... 200/310|
| 7,736,042 | B2  | * | 6/2010  | Park et al. ................. 362/602 |
| 2003/0103359 | A1 | * | 6/2003 | Chiang et al. .............. 362/558 |
| 2004/0114341 | A1 | * | 6/2004 | Ono et al. .................. 362/29 |
| 2007/0121311 | A1 | * | 5/2007 | Chou .......................... 362/23 |
| 2007/0131311 | A1 |   | 6/2007 | Igarashi                             |
| 2007/0258228 | A1 | * | 11/2007 | Hein et al. ................. 362/29 |
| 2008/0304285 | A1 | * | 12/2008 | Iwasaki ...................... 362/612|
| 2009/0121904 | A1 | * | 5/2009 | Liu et al. .................... 341/22|
| 2010/0039297 | A1 | * | 2/2010 | Chou ........................... 341/22|
| 2010/0080019 | A1 | * | 4/2010 | Iwasaki ....................... 362/628|

FOREIGN PATENT DOCUMENTS

TW    566612    12/2003
TW    581961    4/2004

* cited by examiner

*Primary Examiner* — Mary McManmon
(74) *Attorney, Agent, or Firm* — Muncy, Geissler, Olds & Lowe, PLLC (57) ABSTRACT

An uniformly self-luminous keyboard device comprises a housing and a keyboard unit. The housing includes an upper casing and a lower casing, which can be assembled together. After the upper casing and the lower casing are assembled together, an accommodation space is formed therebetween. The upper casing has an opening interconnecting the accommodation space. The keyboard unit is arranged in the accommodation space and includes a plurality of press members passing through the opening and moved by a force to have a displacement, and a baseplate supporting the press members. A light conduction space is formed between the baseplate and the lower casing. A light emitting unit is arranged inside the light conduction space. The height of the light conduction space decreases with the distance to the light emitting unit, whereby light is uniformly distributed over the bottom of the keyboard unit. Thus is achieved the uniformly self-luminous keyboard device.

14 Claims, 7 Drawing Sheets

UNIFORMLY SELF-LUMINOUS KEYBOARD DEVICE

FIELD OF THE INVENTION

The present invention relates to a keyboard device, particularly to an uniformly self-luminous keyboard device.

BACKGROUND OF THE INVENTION

With the development of science and technology, computers have been extensively used in various fields of industry and living. The keyboard is the commonest input device in the current computer systems and usually designed to enable the user to correctly input instructions in different occasions. In a dim or dark environment, the user can learn the operation information from the monitor illuminated by its own light source, but the user cannot recognize the individual keys of the keyboard. Thus is developed a self-luminous keyboard, whereby the user can recognize the keys with his visual perception in dark as he does in a lightened environment.

U.S. Pat. Nos. 5,936,554 and 7,278,750, R.O.C patents No. 566612 and No. 581961 respectively disclosed keyboard devices having LEDs inside keys, wherein each single key is illuminated by the LED thereinside, whereby users can make out the keys in a dim or dark environment. The technologies disclosed in the prior-art patents can indeed solve the problem that the user cannot recognize the keys in dark. However, a standard keyboard may have over one hundred keys, and the prior-art keyboard devices need the same number of LEDs, which not only increases the fabrication steps and fabrication cost but also impairs the lightweighting of keyboards. Besides, numerous LEDs consume a lot of power and generate considerable heat.

An US patent of publication No. 20070131311 disclosed a backlighted keyboard, wherein a bridge plate and a baseplate define a light conduction space. At least one light conduction member is arranged in the bridge plate and corresponding to the keys. The light conduction members conduct the light entering the light conduction space to the keys. Thus is formed the structure of the backlighted keyboard. Different from the abovementioned prior arts that each key has its own LED, the prior art can effectively decrease the number of LEDs, simplify the keyboard structure and save energy. However, light spread unevenly on the keyboard, and the distal keys have lower brightness.

SUMMARY OF THE INVENTION

The primary objective of the present invention is to make the keys of a self-luminous keyboard have uniform brightness. To achieve the abovementioned objective, the present invention proposes an uniformly self-luminous keyboard device, which comprises a housing and a keyboard unit. The housing includes an upper casing and a lower casing, which can be assembled together. After the upper casing and the lower casing are assembled together, an accommodation space is formed therebetween. The upper casing has an opening interconnecting the accommodation space. The keyboard unit is arranged in the accommodation space and includes a plurality of press members passing through the opening and moved by a force to have a displacement and a baseplate supporting the press members. A light conduction space is formed between the baseplate and the lower casing. A light emitting unit is arranged inside the light conduction space. The height of the light conduction space decreases with the distance to the light emitting unit.

The light emitting unit is arranged on the lower casing. The press member has a keycap, an actuation mechanism coupled to the keycap, and an elastic member arranged inside the actuation mechanism and enabling the press member to move vertically to-and-fro with respect to the baseplate. The baseplate has fixing members used to fix the actuation mechanisms. The baseplate includes a support layer coupled to the press members and a circuit layer sending out an instruction signal according to the displacement of the press member.

To highlight individual press members, a shielding member is arranged between the press members and the light emitting unit, and includes a light shielding area and a plurality of light penetration areas corresponding to bottoms of the press members.

The present invention discloses several embodiments to make the height of the light conduction space decrease with the distance to the light emitting unit.

In one embodiment, the baseplate has a tilt angle with respect to the lower casing.

In another embodiment, the thickness of the baseplate gradually increases with the distance to the light emitting unit.

In yet another embodiment, a reflection member is arranged on the lower casing and faces the light conduction space, and the height of the reflection member gradually increases with the distance to the light emitting unit.

In still another embodiment, a reflection surface is arranged on the lower casing and faces the light conduction space, and the thickness of the lower casing gradually increases with the distance to the light emitting unit.

In the abovementioned embodiments, a support member is arranged inside the light conduction space and used to support the baseplate lest the baseplate be displaced by the press member. The support member includes a plurality of ribs connected to the lower casing and a support plane arranged on the upper edges of the ribs and connected to the baseplate. To provide a more uniform support effect, a support plate may be arranged on the support plane, and a plurality of light permeating holes is formed on the support plate and corresponding to the press members.

In the present invention, the height of the light conduction space, which is defined by the baseplate and the lower casing, decreases with the distance to the light emitting unit, whereby the brightness of the press members will not vary with the distance to the light emitting unit, wherefore the present invention can realize an uniformly self-luminous keyboard device.

DETAILED DESCRIPTION OF THE PREFERRED EMBODIMENTS

Below, the technical contents of the present invention are described in detail in cooperation with the drawings.

Figure 1:
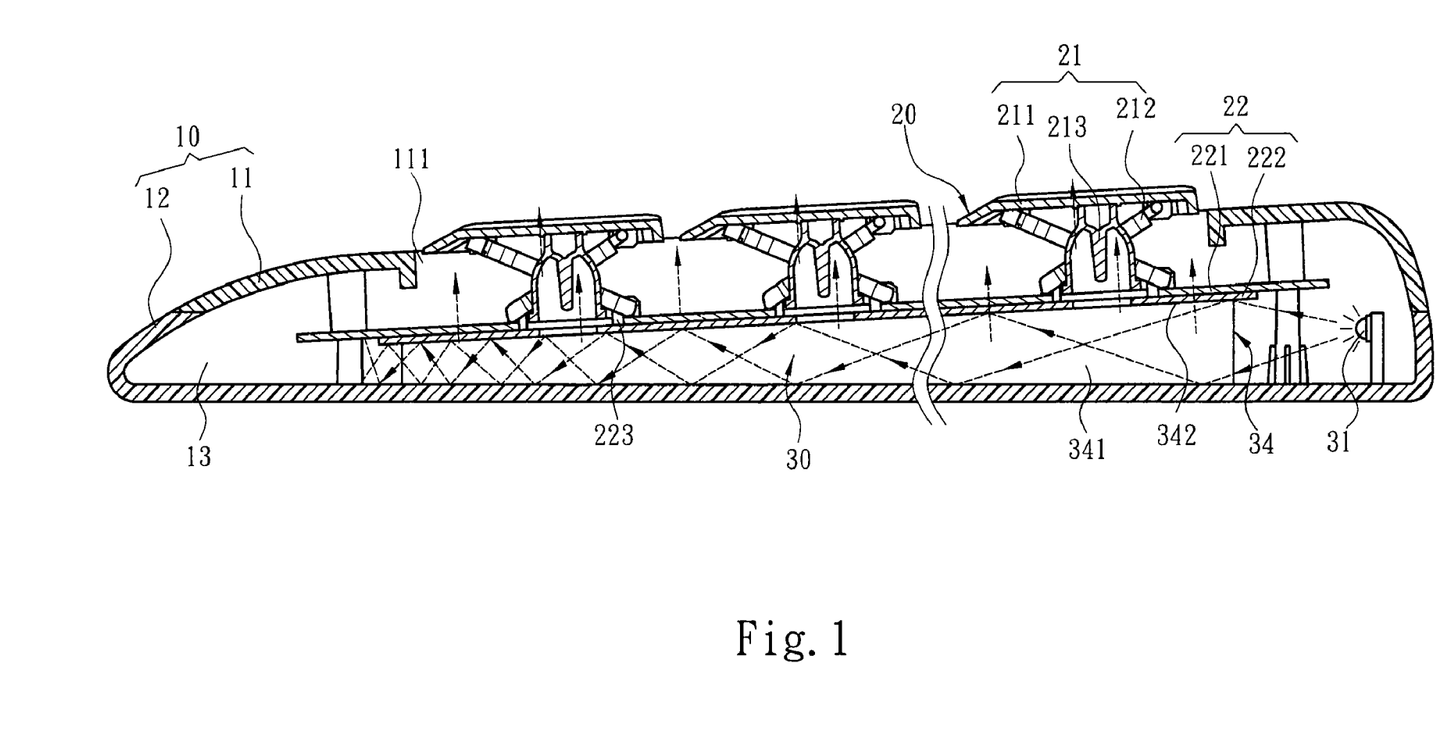
FIG. 1 is a sectional view schematically showing the structure of an uniformly self-luminous keyboard device according to a preferred embodiment of the present invention.

Refer to FIG. 1, a sectional view schematically showing the structure of an uniformly self-luminous keyboard device according to a preferred embodiment of the present invention. The uniformly self-luminous keyboard device comprises a housing 10. The housing 10 includes an upper casing 11 and a lower casing 12, which can be assembled together. After the upper casing 11 and the lower casing 12 are assembled together, an accommodation space 13 is formed therebetween. The upper casing 11 has an opening 111 interconnecting the accommodation space 13. The keyboard device of the present invention also has a keyboard unit 20 arranged in the accommodation space 13. The keyboard unit 20 has a plurality of press members 21 passing through the opening 111 and a baseplate 22 supporting the press members 21.

The press member 21 has a keycap 211, an actuation mechanism 212 coupled to the keycap 211 and an elastic member 213 enabling the press member 21 to move vertically to-and-fro with respect to the baseplate 22. The actuation mechanism 212 determines the displacement of the press member 21 according to the force applied to the keycap 211 of the press member 21. The baseplate 22 at least includes a support layer 221 coupled to the press members 21 and a circuit layer 222 sending out an instruction signal according to the displacement of the press member 21. The circuit layer 222 may be a rigid printed circuit board or a flexible printed circuit board. The support layer 221 has fixing members 223 arranged corresponding to the ends of the actuation mechanisms 212 and used to fix the press members 21 to the baseplate 22. A light conduction space 30 is formed between the baseplate 22 and the lower casing 12. A light emitting unit 31 is arranged inside the light conduction space 30 and on the lower casing 12. The light emitting unit 31 may be a light emitting diode (LED) or an electroluminescent sheet. A preferred embodiment of the present invention takes LED as a representative.

The height of the light conduction space 30 decreases with the distance to the light emitting unit 31, whereby the light is uniformly distributed over the light conduction space 30, and the brightness does not vary with the distance to the light emitting unit 31. Below are disclosed several embodiments to exemplify the present invention.

Figure 2:
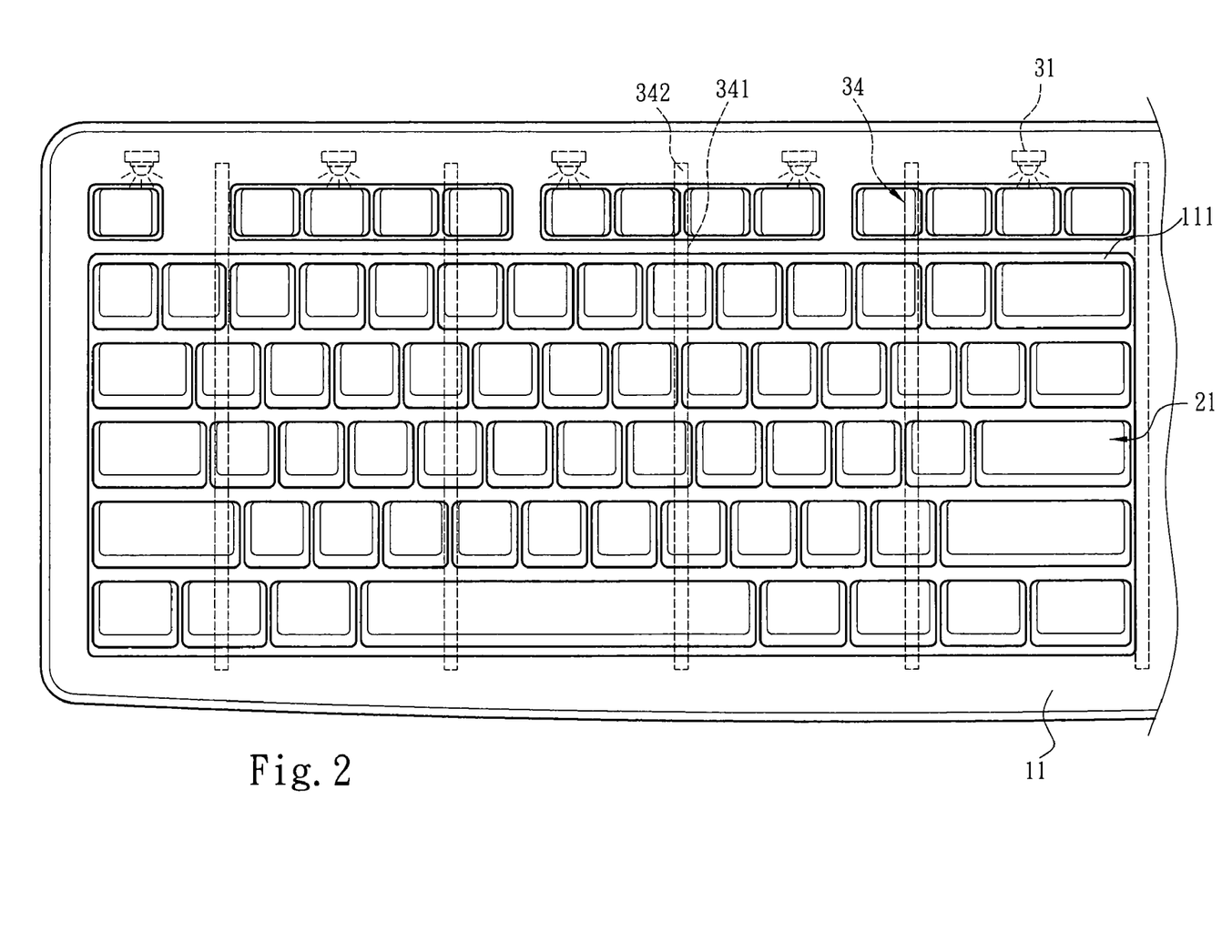
FIG. 2 is a bottom view schematically showing the appearance of a lower casing of an uniformly self-luminous keyboard device according to a preferred embodiment of the present invention.
Figure 7:
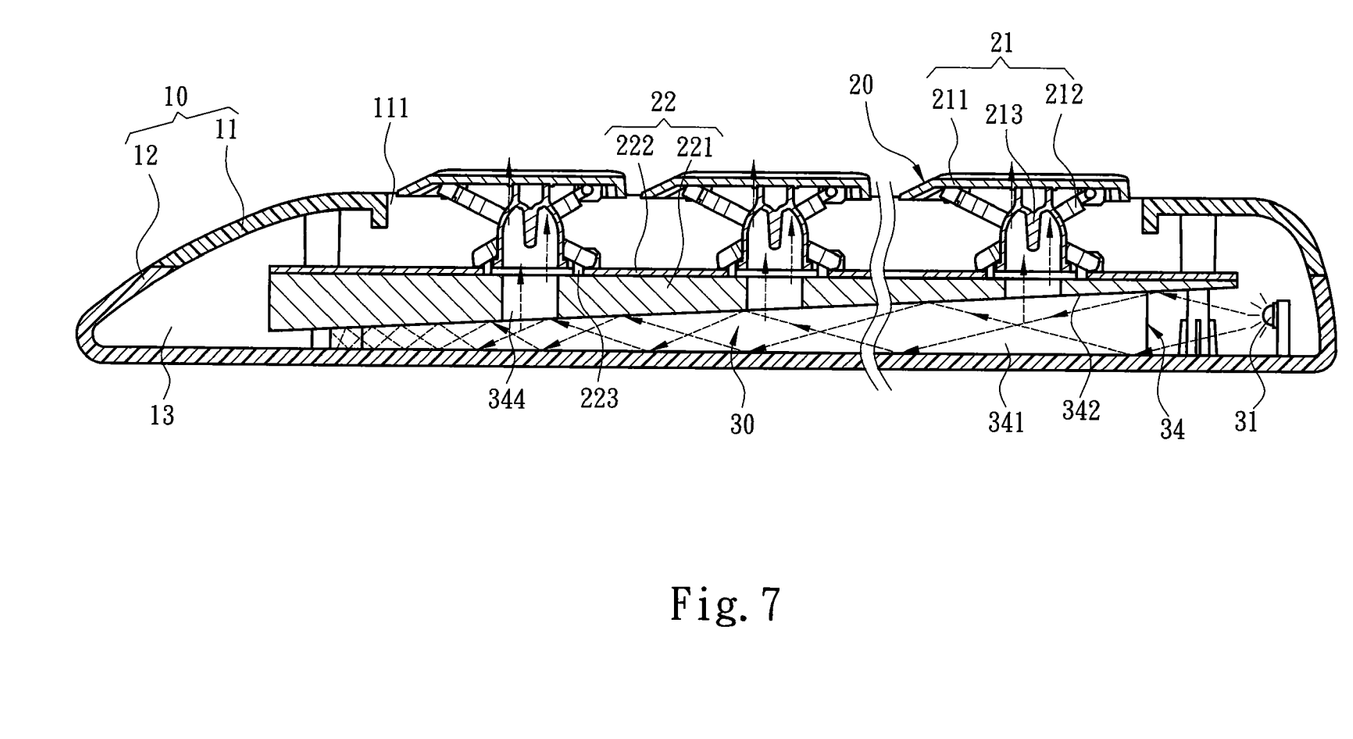
FIG. 7 is a sectional view schematically showing that the thickness of a baseplate is increased according to one embodiment of the present invention.

In FIG. 1, the baseplate 22 is an identical-thickness structure and has a tilt angle with respect to the lower casing 12, whereby the height of the light conduction space 30 decreases continuously with the distance to the light emitting unit 31, and whereby the increased reflection effect caused by the decreased height can offset the decreased brightness in the distal end. Or in another embodiment, (See FIG. 7) the thickness of the support layer 221 gradually increases with increasing distance away from the light emitting unit 31. Therefore, light is uniformly distributed over the light conduction space 30 and then uniformly projected onto the press members 21. The circuit layer 222 of the baseplate 22 may be a thin-film circuit board. General to speak, a thin-film circuit board is flexible and likely to deform by external force. When the press member 21 is displaced by force, the circuit layer 222 may also be displaced; thus, the sensitivity of the circuit layer 222 may also be affected. Therefore, as shown in FIG. 1 and FIG. 2, a support member 34 is arranged inside the light conduction space 30 and used to support the baseplate 22 lest the baseplate 22 be displaced by the press member 21. The support member 34 includes a plurality of ribs 341 connected to the lower casing 12 and a support plane 342 arranged on the upper edges of the ribs 341 and connected to the baseplate 22.

Figure 3:
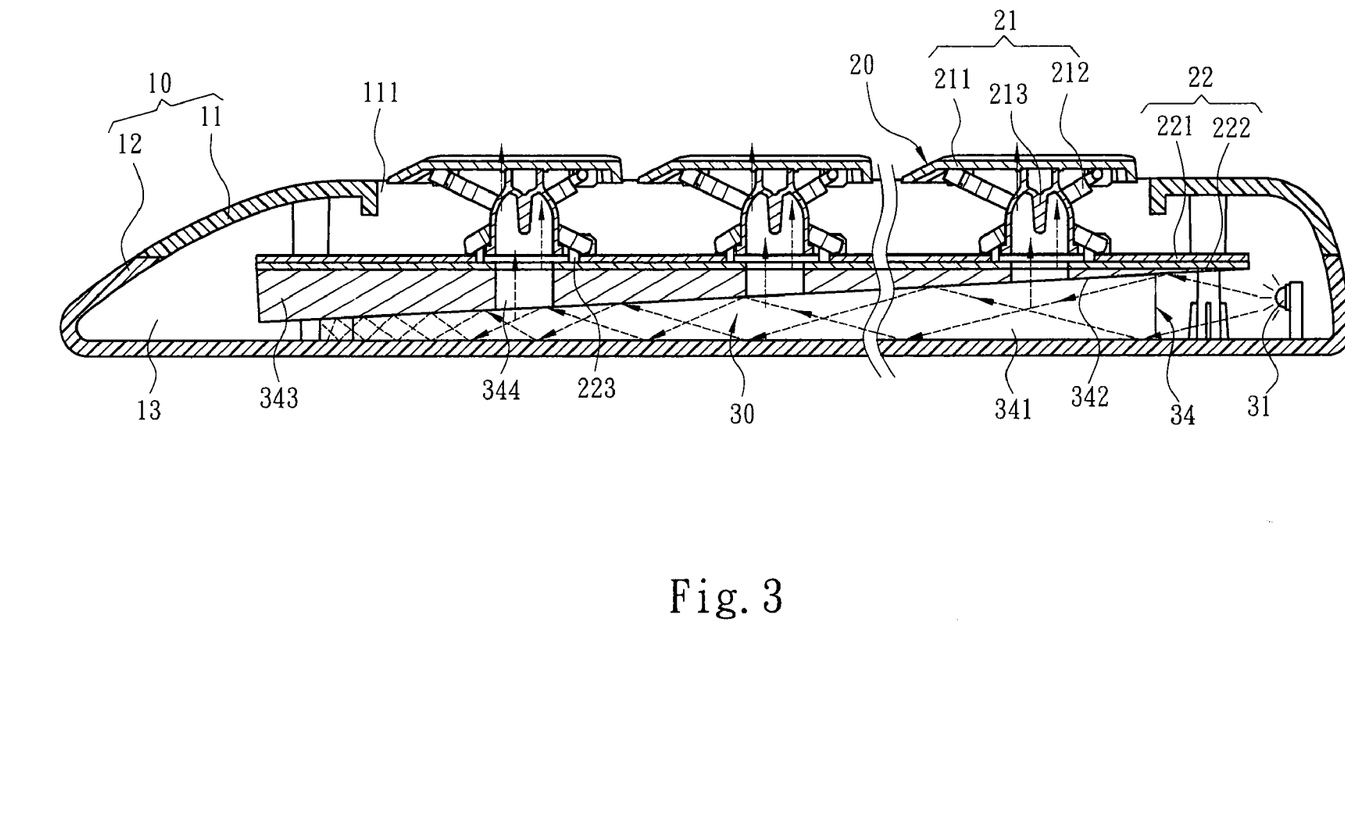
FIG. 3 is a sectional view schematically showing a support plate of an uniformly self-luminous keyboard device according to one embodiment of the present invention.

Refer to FIG. 3. In another embodiment, a support plate 343 is arranged on the support plane 342 to provide the baseplate 22 a more uniform support effect. The thickness of the support plate 343 increases with the distance to the light emitting unit 31 so that the height of the light conduction space 30 can decrease continuously with the distance to the light emitting unit 31 and light can be uniformly distributed over the light conduction space 30. The support plate 343 may be a rigid board providing sufficient support strength, such as a metallic plate or an acrylic plate. If the support plate 343 is made of a non-light permeable material, a plurality of light permeating holes 344 is formed on the support plate 343. Thus, the light inside the light conduction space 30 can pass through the light permeating holes 344 to the press members 21.

Figure 4:
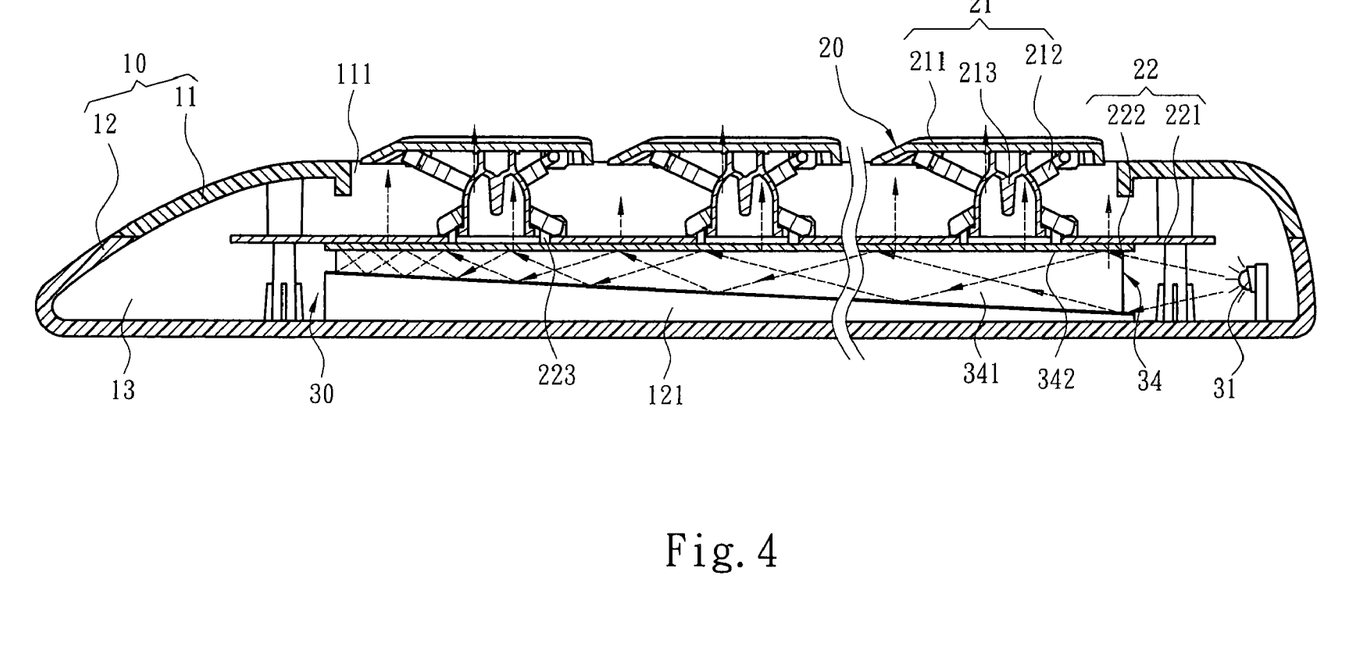
FIG. 4 is a sectional view schematically showing a reflection member on a lower casing of an uniformly self-luminous keyboard device according to one embodiment of the present invention.
Figure 5:
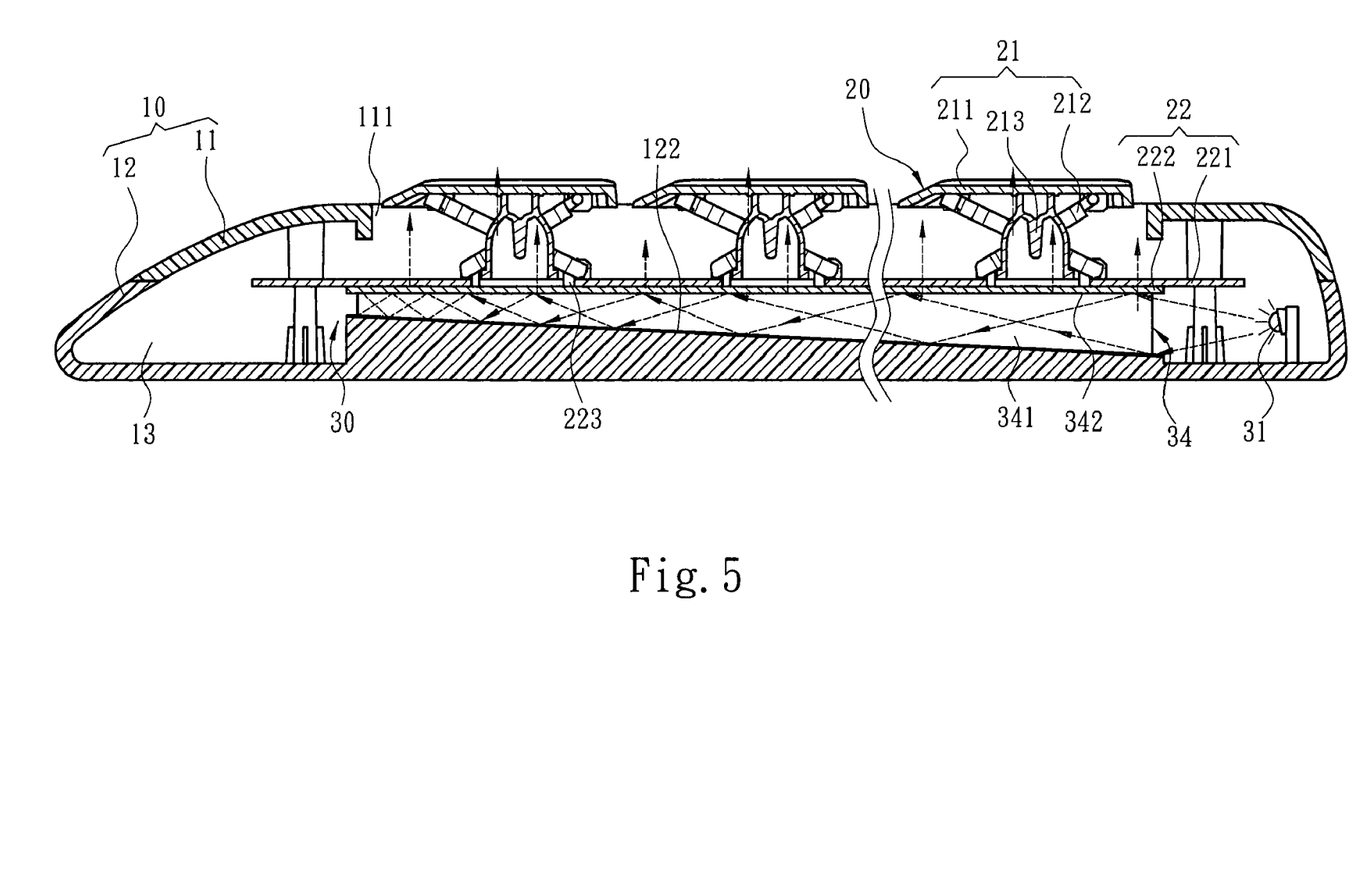
FIG. 5 is a sectional view schematically showing that the thickness of a lower casing is increased according to one embodiment of the present invention.

Refer to FIG. 4. In yet another embodiment, a reflection member 121 is arranged on the lower casing 12 and faces the light conduction space 30, and the height of the reflection member 121 gradually increases with the distance to the light emitting unit 31. Refer to FIG. 5. In still another embodiment, a reflection surface 122 is arranged on the lower casing 12 and faces the light conduction space 30, and the thickness of the lower casing 12 gradually increases with the distance to the light emitting unit 31. In the two embodiments mentioned above, the height of the light conduction space 30 decreases with the distance to the light emitting unit 31, and light is uniformly distributed over the light conduction space 30.

Figure 6:
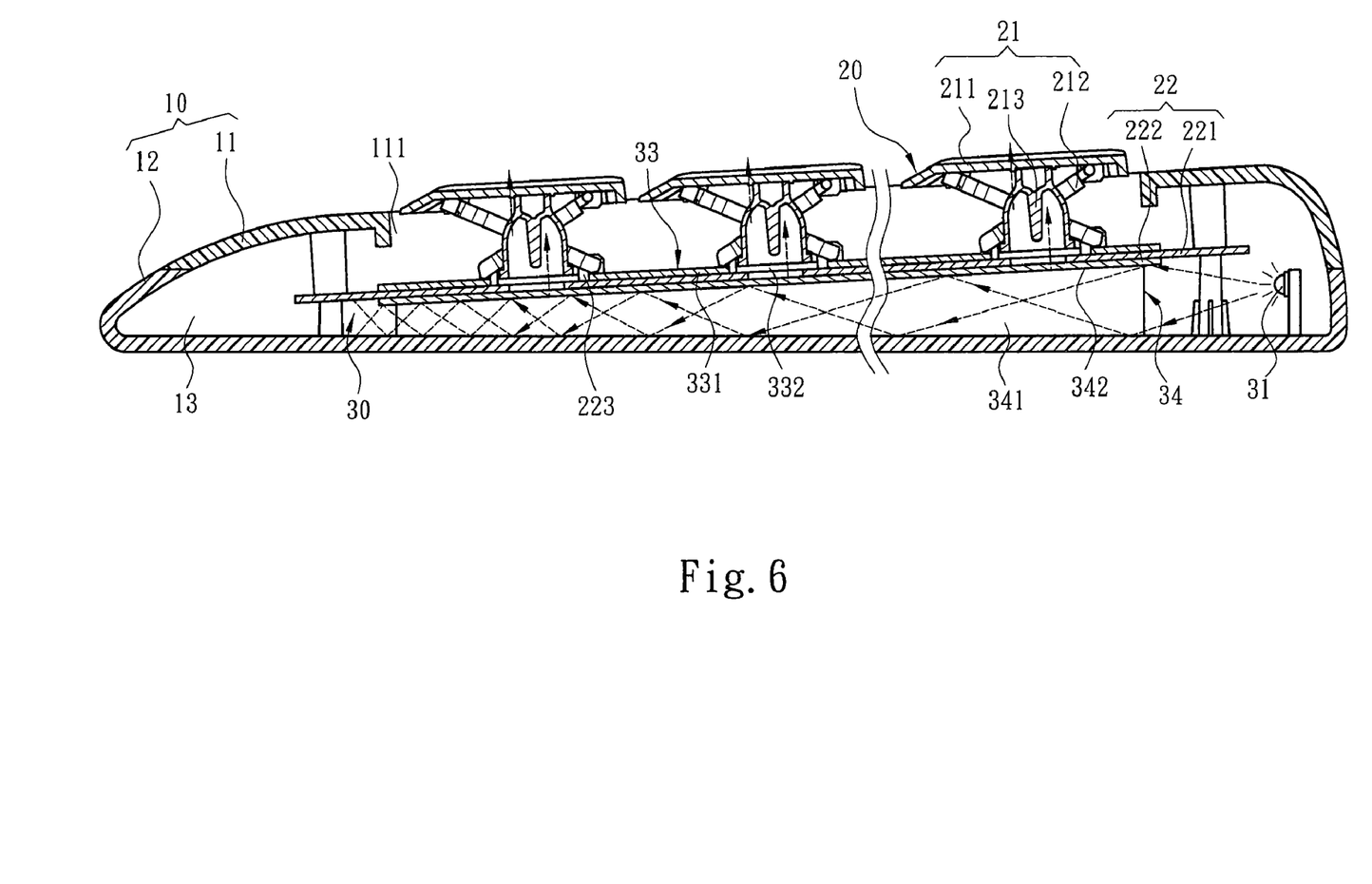
FIG. 6 is a sectional view schematically showing a shielding member of an uniformly self-luminous keyboard device according to one embodiment of the present invention.

Refer to FIG. 6. In a further embodiment, a shielding member 33 is arranged between the press members 21 and the light emitting unit 31. The shielding member 33 includes a light shielding area 331 and a plurality of light penetration areas 332 corresponding to the bottoms of the press members 21, whereby the press members 21 have higher brightness than the other regions sheltered by the light shielding area 331. Thus, the user can easily recognize the press members 21.

In the present invention, the height of the light conduction space defined by the baseplate and the lower casing gradually decreases with the distance to the light emitting unit, whereby light is uniformly distributed over the light conduction space, and the press members are also uniformly illuminated. Thus is achieved the uniformly self-luminous keyboard device. From the above description, it is proved that the present invention indeed possesses novelty and non-obviousness and meets the conditions for a patent. Thus, the Inventor files the application for a patent. It will be appreciated if the patent is approved fast.

The embodiments described above are only to exemplify the present invention but not to limit the scope of the present invention. Therefore, any equivalent modification or variation according to the spirit of the present invention is to be also included within the scope of the present invention.

What is claimed is:

1. An uniformly self-luminous keyboard device comprising:
   a housing including an upper casing and a lower casing, wherein said upper casing and said lower casing can be assembled together to form an accommodation space therebetween, and said upper casing has an opening interconnecting said accommodation space; and a keyboard unit arranged in said accommodation space and including a plurality of press members passing through said opening and a baseplate supporting said press members, wherein said press member is moved by a force to have a displacement, and wherein said baseplate and said lower casing define a light conduction space under the plurality of press members, and a light emitting unit is arranged inside said light conduction space, the light conduction space including a first end and a second end respectively corresponding to two opposite edges of the baseplate, a plurality of press members being located above the light conduction space along the length of the space from the first end to the second end and the light emitting unit providing light distributed over said light conduction space, and height of said light conduction space decreases continuously from the first end to the second end thereof along one direction away from said light emitting unit.

2. The uniformly self-luminous keyboard device according to claim 1, wherein said press member has a keycap, an actuation mechanism coupled to said keycap, and an elastic member enabling said press member to move vertically to-and-fro with respect to said baseplate.

3. The uniformly self-luminous keyboard device according to claim 2, wherein said baseplate has fixing members used to fix said actuation mechanisms.

4. The uniformly self-luminous keyboard device according to claim 1, wherein said baseplate includes a support layer coupled to said press members, and a circuit layer sending out an instruction signal according to a displacement of said press member.

5. The uniformly self-luminous keyboard device according to claim 1, wherein said light emitting unit is arranged on said lower casing.

6. The uniformly self-luminous keyboard device according to claim 1, wherein said baseplate has a tilt angle with respect to said lower casing.

7. The uniformly self-luminous keyboard device according to claim 1, wherein thickness of said baseplate gradually increases with increasing distance away from said light emitting unit.

8. The uniformly self-luminous keyboard device according to claim 1, wherein a reflection member is arranged on said lower casing and faces said light conduction space, and height of said reflection member gradually increases with increasing distance away from said light emitting unit.

9. The uniformly self-luminous keyboard device according to claim 1, wherein a reflection surface is arranged on said lower casing and faces said light conduction space, and thickness of said lower casing gradually increases with increasing distance away from said light emitting unit.

10. The uniformly self-luminous keyboard device according to claim 1, wherein a shielding member is arranged between said press members and said light emitting unit, and includes a light shielding area and a plurality of light penetration areas corresponding to bottoms of said press members.

11. The uniformly self-luminous keyboard device according to claim 1, wherein a support member is arranged inside said light conduction space and used to support said baseplate.

12. The uniformly self-luminous keyboard device according to claim 11, wherein said support member includes a plurality of ribs connected to said lower casing and a support plane arranged on upper edges of said ribs.

13. The uniformly self-luminous keyboard device according to claim 12, wherein a support plate is arranged on said support plane.

14. The uniformly self-luminous keyboard device according to claim 13, wherein a plurality of light permeating holes is formed on said support plate and corresponding to said press members.

* * * * *